(12) United States Patent
Robinson

(10) Patent No.: US 10,808,398 B1
(45) Date of Patent: Oct. 20, 2020

(54) JOINT SEAL WITH INTERNAL BODIES AND VERTICALLY-ALIGNED MAJOR BODIES

(71) Applicant: Schul International Co., LLC, Pelham, NH (US)

(72) Inventor: Steven R. Robinson, Windham, NH (US)

(73) Assignee: Schul International Co., LLC, Hudson, NH (US)

( * ) Notice: Subject to any disclaimer, the term of this patent is extended or adjusted under 35 U.S.C. 154(b) by 0 days.

(21) Appl. No.: 16/379,295

(22) Filed: Apr. 9, 2019

(51) Int. Cl.
*E04B 1/68* (2006.01)
*B32B 27/06* (2006.01)

(52) U.S. Cl.
CPC .......... *E04B 1/6812* (2013.01); *B32B 27/065* (2013.01); *E04B 2001/6818* (2013.01)

(58) Field of Classification Search
CPC .... E04B 1/6812; E04B 1/6815; E04B 1/6818; B32B 27/065
See application file for complete search history.

(56) References Cited

U.S. PATENT DOCUMENTS

| | | | |
|---|---|---|---|
| 5,130,176 A * | 7/1992 | Baerveldt | B32B 5/32 428/192 |
| 5,935,695 A * | 8/1999 | Baerveldt | E04B 1/6812 428/218 |
| 8,317,444 B1 | 11/2012 | Hensley | |
| 8,341,908 B1 | 1/2013 | Hensley et al. | |
| 8,365,495 B1 | 2/2013 | Witherspoon | |
| 8,739,495 B1 | 6/2014 | Witherspoon | |
| 8,813,449 B1 | 8/2014 | Hensley et al. | |
| 8,813,450 B1 | 8/2014 | Hensley et al. | |
| 8,870,506 B2 | 10/2014 | Hensley et al. | |
| 9,068,297 B2 | 6/2015 | Hensley et al. | |
| 9,200,437 B1 | 12/2015 | Hensley et al. | |
| 9,206,596 B1 | 12/2015 | Robinson | |
| 9,322,163 B1 | 4/2016 | Hensley | |
| 9,404,581 B1 | 8/2016 | Robinson | |
| 9,528,262 B2 | 12/2016 | Witherspoon | |
| 9,631,362 B2 | 4/2017 | Hensley et al. | |
| 9,637,915 B1 | 5/2017 | Hensley et al. | |
| 9,644,368 B1 | 5/2017 | Witherspoon | |
| 9,670,666 B1 | 6/2017 | Witherspoon et al. | |

(Continued)

FOREIGN PATENT DOCUMENTS

DE 4115216 A1 * 11/1992 ............... B32B 5/32
DE 102012101989 A1 * 9/2012 ........... E04B 1/6813

(Continued)

OTHER PUBLICATIONS

Blaine R. Copenheaver, International Search Report—PCT/US2020/026859, dated Jun. 23, 2020, 2 pages, USPTO as ISA, Alexandria, Virginia, USA.

(Continued)

*Primary Examiner* — Adriana Figueroa

(74) *Attorney, Agent, or Firm* — Crain, Caton & James, P.C.; James E. Hudson, III

(57) ABSTRACT

A system for creating a joint filler or seal in the gap between adjacent panels or assemblies. An expansion joint seal system includes multiple bodies of differing sizes and compressibilities, which when compressed provide water resistance and localized areas of increased density.

20 Claims, 3 Drawing Sheets

(56) References Cited

U.S. PATENT DOCUMENTS

| | | |
|---|---|---|
| 9,689,157 B1 | 6/2017 | Hensley et al. |
| 9,689,158 B1 | 6/2017 | Hensley et al. |
| 9,739,049 B1 | 8/2017 | Robinson |
| 9,739,050 B1 | 8/2017 | Hensley et al. |
| 9,745,738 B2 | 8/2017 | Robinson |
| 9,765,486 B1 | 9/2017 | Robinson |
| 9,803,357 B1 | 10/2017 | Robinson |
| 9,840,814 B2 | 12/2017 | Robinson |
| 9,850,662 B2 | 12/2017 | Hensley |
| 9,856,641 B2 | 1/2018 | Robinson |
| 9,951,515 B2 | 4/2018 | Robinson |
| 9,963,872 B2 | 5/2018 | Hensley et al. |
| 9,982,428 B2 | 5/2018 | Robinson |
| 9,982,429 B2 | 5/2018 | Robinson |
| 9,995,036 B1 | 6/2018 | Robinson |
| 10,000,921 B1 | 6/2018 | Robinson |
| 10,060,122 B2 | 8/2018 | Robinson |
| 10,066,386 B2 | 9/2018 | Robinson |
| 10,066,387 B2 | 9/2018 | Hensley et al. |
| 10,081,939 B1 | 9/2018 | Robinson |
| 10,087,619 B1 | 10/2018 | Robinson |
| 10,087,620 B1 | 10/2018 | Robinson |
| 10,087,621 B1 | 10/2018 | Robinson |
| 10,072,413 B2 | 11/2018 | Hensley et al. |
| 10,125,490 B2 | 11/2018 | Robinson |
| 10,179,993 B2 | 1/2019 | Hensley et al. |
| 10,203,035 B1 | 2/2019 | Robinson |
| 10,213,962 B2 | 2/2019 | Robinson |
| 10,227,734 B1 | 3/2019 | Robinson |
| 10,233,633 B2 | 3/2019 | Robinson |
| 10,240,302 B2 | 3/2019 | Robinson |
| 10,280,610 B1 | 5/2019 | Robinson |
| 10,280,611 B1 | 5/2019 | Robinson |
| 10,316,661 B2 | 6/2019 | Hensley et al. |
| 10,323,360 B2 | 6/2019 | Robinson |
| 10,323,407 B1 | 6/2019 | Robinson |
| 10,323,408 B1 | 6/2019 | Robinson |
| 10,323,409 B1 | 6/2019 | Robinson |
| 10,352,003 B2 | 7/2019 | Robinson |
| 10,352,039 B2 | 7/2019 | Robinson |
| 10,358,777 B2 | 7/2019 | Robinson |
| 10,358,813 B2 | 7/2019 | Robinson |
| 10,385,518 B2 | 8/2019 | Robinson |
| 10,385,565 B2 | 8/2019 | Robinson |
| 10,407,901 B2 | 9/2019 | Robinson |
| 10,422,127 B2 | 9/2019 | Hensley et al. |
| 10,480,136 B2 | 11/2019 | Robinson |
| 10,480,654 B2 | 11/2019 | Robinson |
| 10,519,651 B2 | 12/2019 | Hensley et al. |
| 10,533,315 B2 | 1/2020 | Robinson |
| 10,533,316 B1 | 1/2020 | Robinson |
| 2014/0219719 A1 | 8/2014 | Hensley et al. |
| 2014/0360118 A1 | 12/2014 | Hensley et al. |
| 2015/0068139 A1 | 3/2015 | Witherspoon |
| 2017/0130450 A1 | 5/2017 | Witherspoon |
| 2017/0159817 A1 | 6/2017 | Robinson |
| 2017/0191256 A1 | 7/2017 | Robinson |
| 2017/0226733 A1 | 8/2017 | Hensley et al. |
| 2017/0241132 A1 | 8/2017 | Witherspoon |
| 2017/0254027 A1 | 9/2017 | Robinson |
| 2017/0268222 A1 | 9/2017 | Witherspoon et al. |
| 2017/0284083 A1 * | 10/2017 | Hensley ............... F16J 15/022 |
| 2017/0292262 A1 | 10/2017 | Hensley et al. |
| 2017/0298618 A1 | 10/2017 | Hensley et al. |
| 2017/0314213 A1 | 11/2017 | Robinson |
| 2017/0314258 A1 | 11/2017 | Robinson |
| 2017/0342665 A1 | 11/2017 | Robinson |
| 2017/0342708 A1 | 11/2017 | Hensley et al. |
| 2017/0370094 A1 | 12/2017 | Robinson |
| 2018/0002868 A1 | 1/2018 | Robinson |
| 2018/0010330 A1 | 1/2018 | Hamilton et al. |
| 2018/0016784 A1 | 1/2018 | Hensley et al. |
| 2018/0038095 A1 | 1/2018 | Robinson |
| 2018/0106001 A1 | 4/2018 | Robinison |
| 2018/0106032 A1 | 4/2018 | Robinison |
| 2018/0119366 A1 | 5/2018 | Robinison |
| 2018/0142465 A1 | 5/2018 | Robinison |
| 2018/0148922 A1 | 5/2018 | Robinison |
| 2018/0163394 A1 | 6/2018 | Robinison |
| 2018/0171564 A1 | 6/2018 | Robinison |
| 2018/0171625 A1 | 6/2018 | Robinison |
| 2018/0202148 A1 | 7/2018 | Hensley et al. |
| 2018/0238048 A1 | 8/2018 | Robinison |
| 2018/0266103 A1 | 9/2018 | Robinson |
| 2018/0274228 A1 | 9/2018 | Robinson |
| 2018/0300490 A1 | 10/2018 | Robinson |
| 2018/0363292 A1 | 12/2018 | Robinson |
| 2018/0371746 A1 | 12/2018 | Hensley et al. |
| 2018/0371747 A1 | 12/2018 | Hensley et al. |
| 2019/0057215 A1 | 2/2019 | Robinson |
| 2019/0063608 A1 | 2/2019 | Robinson et al. |
| 2019/0071824 A1 | 3/2019 | Robinson |
| 2019/0107201 A1 | 4/2019 | Robinson |
| 2019/0108351 A1 | 4/2019 | Robinson |
| 2019/0194880 A1 | 6/2019 | Robinson |
| 2019/0194935 A1 | 6/2019 | Robinson |
| 2019/0211546 A1 | 7/2019 | Hensley et al. |
| 2019/0242070 A1 | 8/2019 | Robinson |
| 2019/0242117 A1 | 8/2019 | Robinson |
| 2019/0242118 A1 | 8/2019 | Robinson |
| 2019/0249420 A1 | 8/2019 | Robinson |
| 2019/0249421 A1 | 8/2019 | Robinson |
| 2019/0249422 A1 | 8/2019 | Robinson |
| 2019/0249423 A1 | 8/2019 | Robinson |
| 2019/0266335 A1 | 8/2019 | Robinson |
| 2019/0271150 A1 | 9/2019 | Robinson |
| 2019/0271151 A1 | 9/2019 | Robinson |
| 2019/0323347 A1 | 10/2019 | Hensley et al. |
| 2020/0018061 A1 | 1/2020 | Robinson |

FOREIGN PATENT DOCUMENTS

| | | | |
|---|---|---|---|
| EP | 0103494 A2 * | 3/1984 | ........... E04B 1/6812 |
| GB | 882291 A * | 11/1961 | ............ E01C 11/126 |
| GB | 1225382 A * | 3/1971 | ........... E01D 19/062 |

OTHER PUBLICATIONS

Blaine R. Copenheaver, Written Opinion of the International Searching Authority—PCT/US2020/026859, dated Jun. 23, 2020, 8 pages, USPTO as ISA, Alexandria, Virginia, USA.

* cited by examiner

JOINT SEAL WITH INTERNAL BODIES AND VERTICALLY-ALIGNED MAJOR BODIES

CROSS-REFERENCE TO RELATED APPLICATIONS

None.

STATEMENT REGARDING FEDERALLY SPONSORED RESEARCH OR DEVELOPMENT

Not Applicable.

BACKGROUND

Field

The present disclosure relates generally to systems for creating a joint filler or seal in the gap between adjacent panels or assemblies. More particularly, the present disclosure is directed to providing an expansion joint seal system which includes multiple bodies of differing sizes and compressibilities, which when compressed provides water resistance and localized areas of increased density.

Description of the Related Art

Construction panels and other assemblies come in many different size and shapes and may be used for various purposes, including curtain wall, aluminum and glass panels, roadways, surfaceways, tunnels and other pre-cast structures. Because of the effects of the co -efficient of thermal expansion between similar and dissimilar materials, and external forces such as wind and seismic movement, it is necessary to form a lateral gap or joint between adjacent panels, buildings, or building sections to allow for independent movement. These gaps are also used to permit moisture to be collected and expelled. Cavity walls are common in masonry construction, typically to allow for water or moisture to condense or accumulate in the cavity or space between the two exterior walls. Collecting and diverting moisture from the cavity wall construction can be accomplished by numerous well-known systems. The cavity wall is often ventilated, such as by brick vents, to allow air flow into the cavity wall and to allow the escape of moisture heat or humidity. In addition to thermal movement or seismic joints in masonry walls, control joints are often added to allow for the known dimensional changes in masonry over time. A curtain wall or rain screen design is another common form of exterior cladding similar to a masonry cavity wall. Curtain walls can be designed to be primarily watertight but can also allow for the collection and diversion of water to the exterior of the structure. A cavity wall or curtain wall design cannot function as intended if the water or moisture is allowed to accumulate or condense in the cavity wall or behind a curtain wall or rain screen design cannot be diverted or redirected back to the outsurface of the wall. If moisture is not effectively removed it can cause damage ranging from aesthetic in the form of white efflorescence buildup on surface to mold and major structural damage from freeze/thaw cycling.

Thus, expansion and movement joints are a necessary part of all areas of construction. The size and location of the movement depends on variables such as the amount of anticipated thermal expansion, load deflection and any expected seismic activity. Joint movement in a structure can be cyclical in design as in an expansion joint or in as a control joint to allow for the shrinkage of building components or structural settling. These movement joints serve an important function by allowing a properly designed structure to move and the joint to cycle over time and to allow for the expected dimensional changes without damaging the structure. Expansion, control and movement joints are found throughout a structure from the roof to the basement, and in transitions between horizontal and vertical planes. It is an important function of these expansion joints to not only move as intended but to remain in place through their useful lifespan. This is often accomplished by extending the length and/or width of the expansion joint system over or past the edge of the gap or joint opening to attach to the joint substrate or another building component. Examples of building components that would ideal to integrally join an expansion joint with and seal would be, although not limited to, waterproofing membranes, air barrier systems, roofing systems and transitions requiring the watertight diversion of rain water. Although these joints represent only a small percentage of the building surface area and initial cost, they often account for a large percentage of waterproofing, heat loss, moisture/mold problems and other serious interior and exterior damage during the life of the building.

Conventional joint sealants like gunnable sealants and most foam seals are designed to hold the water out of the structure or expansion joint. However, water can penetrate the joint substrate in many ways such a s cracks, poor sealant installation, rooting details and a porous substrate or wall component. When water or moisture enters the wail the normal sealing function of joint sealant may undesirably retain the moisture in the wall Foam joint seals known in the art typically rely on the application of an elastomer sealant on the primary or exposed fax of foam to provide the water resistant function Such joint seals are not waterproof, but retard the penetration of water into the joint by providing a seal between adjacent substrates for a time and under a maximum pressure. Particularly, such joint seals are not waterproof—they do not preclude water penetration under all circumstances. While this is helpful initially to keep water out of the joint and structure it does not allow for this penetrating water or moisture to escape.

Further complicating operation, some wall designs, such as cavity walls, allow for moisture to enter a first wall layer where it collects and is then directed to the outsurface of the building by flashing and weep holes. In these systems, water cap sometimes be undesirably trapped in the cavity wall, such as at a mortar bridge in the wall, or other impediment caused by poor flashing selection, design or installation. When a cavity wall drainage system fails, water is retained within the structure, leading to moisture accumulating within in the wall, and to an efflorescence buildup on the exterior of the wall. This can also result in freeze-thaw damage, among other known problems.

To be effective in this environment, fully functional, foam-based joint seals require a minimum compression ratio. It is known that higher densities and ratios can provide addition sealing benefits. Cost, however, also tends to increase with overall density. There is ultimately a trade-off between compression ratio/density range and reasonable movement capabilities at about 750 kg/m$^3$. As can be appreciated, this compressed density is a product of the uncompressed density of the material and the desired compression ratio to obtain other benefits, such as water resistance. For example, a foam having an uncompressed density of 150 kg/m$^3$ uncompressed and compressed at a 5:1 ratio results in a compressed density of 750 kg/m$^3$. Alternative uncompressed densities and compression ratios may reach that compressed density of 750 kg/m³ while producing different mechanical properties. It has been long known in the art that a functional foam expansion joint sealant can be constructed using a foam having an impregnation which, when uncompressed, has a density range of about 80 kg/m³, which is used at a 5:1 compression ratio, resulting in a compressed density of 400 kg/m³. Various impregnations are known in the art, including binders, fillers, fire-retardant impregnations, water retarding impregnations, and water reactive impregnations. Alternatively, materials may be introduced by infusion, being put into, or being included in the foam. As a further alternative, the materials may be provided as a coating. This functional foam expansion joint sealant is capable of maintaining position within a joint and its profile while accommodating thermal and seismic cycling, while providing effective sealing, resiliency and recovery. Such joint seals are not fireproof, but retard the penetration of fire into the joint by providing a seal which protects the adjacent substrates or the base of the joint for a time and under a maximum temperature. Particularly, such joint seals are not fireproof—they do not preclude the burning and decomposition of the foam when exposed to flame.

Another alternative known in the art for increasing performance is to provide a foam impregnated with a water resistant material at a density in the range of 12-160 kg/m³, ideally at 150 kg/m³ for some products, with a mean joint size compression ratio of about 3:1 with a compressed density in a range of about 400-450 kg/m³, although densities in a broader range, such as 45-710 kg/m³ uncompressed and installed densities, after compression and installation in the joint, of 45 kg/m³ and 1500 kg/m³ may also be used. These criteria ensure excellent movement and cycling while providing for fire resistance according to DIN 4112-2 F120, meeting the Conditions of Allowance under UL 2079 for a two-hour endurance, for conventional depth, without loading, with one or more movement classifications, for a joint not grater than six inches and having a movement rating as great as 100% without a hose stream test, and an ASTM E-84 test result with a Flame Spread of 0 and a Smoke Index of 5. This density range is well known in the art, whether it is achieved by lower impregnation density and higher foam compression or higher impregnation density and a lower compression ratio, as the average functional density required for an impregnated open cell foam to provide sealing and other functional properties while allowing for adequate joint movement up to +/-50% or greater. Foams having a higher uncompressed density may be used in conjunction with a lower compression ratio, but resiliency may be sacrificed. As the compressed density increases, the foam tends to retard water more effectively and provides an improved seal against the adjacent substrates. Additives that increase the hydrophobic properties or inexpensive fillers such as calcium carbonate, silica or alumina hydroxide (ATH) provided in the foam can likewise be provided in a greater density and become more effective. Combustion modified foams such as a combustion modified flexible polyurethane foam, combustion modified ether (CME) foam, combustion modified high resilience (CMHR) foam or combustion modified Viscoelastic foam (CMVE) can be utilized in the preferred embodiments to add significant fire resistance to the impregnated foam seal or expansion joint without adding additional fire-retardant additives. Foam that is inherently fire resistant or is modified when it manufactured to be combustion or fire-resistant reduces the cost of adding and binding a fire retardant into the foam. This method has been found to be advantageous in allowing fire resistance in foam seals configured in very high compression ratios such 5:1 and higher.

By selecting the appropriate additional component, the type of foam, the uncompressed foam density and the compression ratio, the majority of the cell network will be sufficiently closed to impede the flow of water into or through the compressed foam seal thereby acting like a closed cell foam. Beneficially, an impregnated or infused open cell foam can be supplied to the end user in a pre-compressed state in rolls/reels or sticks that allows for an extended release time sufficient to install it into the joint gap. To further the sealing operation, additional components may be included. For example, additives may be fully or partially impregnated, infused or otherwise introduced into the foam such that at least some portion of the foam cells are effectively closed, or a hydrophobic or water resistant coating is applied. However, the availability of additional components may be restricted by the type of foam selected. Closed cell foams which are inherently impermeable for example, are often restricted to a lower joint movement range such as +/-25% rather than the +/-50% of open celled foams. Additionally, the use of closed cell foams restricts the method by which any additive or fillers can be added after manufacture. Functional features such as fire resistance to the Cellulosic time-temperature curve for two hours or greater can be however be achieved in a closed cell foam seal without impacting the movement properties. Intumescent graphite powder added to a polyethylene (PE), ethylene vinyl (EVA) acetate or other closed cell foam during processing in a ratio of about 10% by weight has been found to be highly effective providing flexible and durable water and fire resistant foam seal. While intumescent graphite is preferred, other fire retardants added during the manufacture of the closed cell foam are anticipated and the ratio of known fire retardants, added to the formulation prior to creating the closed cell foam, is dependent on the required fire resistance and type of fire retardant. Open celled foams, however, present difficulties in providing water-resistance and typically require impregnation, infusion or other methods for introducing functional additives into the foam. The thickness of a foam core or sheet, its resiliency, and its porosity directly affect the extent of diffusion of the additive throughout the foam. The thicker the foam core or sheet, the lower its resiliency, and the lower its porosity, the greater the difficulty in introducing the additive. Moreover, even with each of these at optimum, the additive will likely not be equally distributed throughout the foam, but will be at increased density at the inner or outer portions depending on the impregnation technique.

A known solution in the art is the use of foam segments bonded together laterally to provide a lamination. However, such lateral laminations can separate from one another, creating fissures and openings for contaminates. Moreover, because the laminations are laterally positioned, the resulting pressure exerted by the joint seal against the adjacent substrates is a function of the combined densities and thickness and is constant at all heights of the substrate wall.

It is also known that the thin built-up lateral laminations must be adhesively bonded to avoid separation, and therefore failure, under thermal shock, rapid cycling or longitudinal shear. Because of the cost to effectively bond the lateral laminations, a cost/performance assessment sometimes produces laminations loosely held together by the foam compression rather than by an adhesive. While this is known in the art to be somewhat effective in low performance applications and OEM assembly uses, it also known that it cannot meet the demands of high movement seismic, shear, deflection joints or where fail-safe performance is required. In light of these issues, the preferred embodiment for a high movement impregnated foam expansion joint has been found to instead be a monolithic foam design comprised of a single impregnated foam core. However, lamination systems may be desirable when the structure includes a functional component between the laminations such as a water resistant membrane or a fire resistant layer.

Construction of lamination systems have typically been lateral composites which have been considered undesirable or inferior for a high movement or rapid cycling fire resistant expansion joint sealant. The higher compression ratios and greater volumes of fire-retardant additives are likely to cause the foam to fatigue more rapidly and to lose much of its internal recovery force. this proves problematic over time due to the anticipated exposure to movement and cycling as the impregnated foam will tend to lose its recovery force and rely more on the push -pull connection to the joint substrate. When foam laminations are vertically-oriented, the laminations can de-bond or de-laminate and separate from one another, leading to only the outer most lamination remaining attached to the joint substrate, resulting in the laminated foam joint sealant ceasing to provide either water, air or fire resistance.

A known alternative or functional supplement to the use of various impregnation densities and compression ratios is the application of functional surface coatings such as water -resistant elastomers or fire-resistant intumescents, so that the impregnated foam merely serves as a "resilient backer". Almost any physical property available in a sealant or coating can be added to an already impregnated foam sealant layering the functional sealant or coating material. Examples would include but not limited to, fire ratings, waterproofing, color, UV resistance, mold and mildew resistance, soundproofing, impact resistance, load carrying capacity, faster or slower expansion rates, insect resistance, conductivity, chemical resistance, pick-resistance and others known to those skilled in the art. For example, a sealant or coating having a rating or listing for Underwriters Laboratories 2079 may be applied to an impregnated compressed foam to create a fire resistant foam sealant.

One approach to addressing the shortcomings has been the creation of composite materials, where the foam core—whether solid or composed of laminations of the same or differing compositions—is coated or surface impregnated with a functional layer, so that the foam is merely in a resilient backer for the sealant, intumescent or coating, such that the composition and density become less important. These coatings, and the associated properties, may be adhered to the surface of each layer of a core or layered thereon to provide multiple functional properties. As can be appreciated, the composite material may have different coatings applied the different surfaces to provide desired property or properties consistent with its position. Functional coatings such as a water-resistant sealant can protect the foam core from absorbing moisture even if the foam or foam impregnation is hydrophilic. Similarly, a functional coating such as a fire-rated sealant added to the foam core or lamination with protect a foam or foam impregnation that is flammable. A biocide may even be included. This could be layered, or on opposing surfaces, or—the case of a laminate body—on perpendicular surfaces.

Additionally, it has become desirable, and in some situations required, for the joint sealant system to provide not only water resistance, but also fire resistance. A high degree of fire resistance in foams and impregnated foam sealants is well known in the art and has been a building code requirement for foam expansion joints in Europe for more than a decade. Fire ratings such as UL 2079, DIN 4112-2, BS 476, EN1399, AS1503.4 have been used to assess performance of expansion joint seals, as have other fire resistance tests and building codes and as the basis for further fire resistance assessments, the DIN 4112 standard, for example, is incorporated into the DIN 18542 standard for "Sealing of outsurface wall joints with impregnated sealing tapes made of cellular plastics—Impregnated sealing tapes". While each testing regime utilizes its own requirements for specimen preparation and tests (water test, hose stream tests, cycling tests), the 2008 version of UL 2079, the ISO 834, BS 476: Part 20, DIN 4112, and AS 1530.4-2005 use the Cellulosic time/temperature curve, based on the burning rate of materials found in general building materials and contents, which can be described by the equation $T=20+345*LOG(8*t+1)$, where t is time in minutes and T is temperature in C. While differing somewhat, each of these testing regimes addresses cycling and water resistance, as these are inherent in a fire resistant expansion joint. The fire resistance of a foam sealant or expansion has been sometimes partially or fully met by infusing, impregnating or otherwise putting into the foam a liquid-based fire retardant, such as aluminum trihydrate or other fire retardants commonly used to add fire resistance to foam. Unfortunately, this increases weight, alters the foam's compressibility, and may not provide the desired result without additional fire resistant coatings or additives if a binder, such as acrylic or polyurethane, is selected to treat the foam for fire and water resistance. Doing so while maintaining movement properties may affect the foam's compressibility at densities greater than 750 kg/m$^3$. Ultimately, these specialty impregnates and infused compositions increase product cost.

It has further become desirable or functionally required to apply a fire resistant coating to the foam joint systems to increase fire and water resistance, but often at the sacrifice of movement. Historically, fire-resistant foam sealant products that use an additional fire resistant surface coating to obtain the life safety fire properties have been limited to only +/−25% movement capability, especially when required to meet longer time-temperature requirements such as UL2079's 2 hour or longer testing. This +/−25% movement range is too limited for most movement joints and would not meet most seismic movement and expansion joint requirements. One well-known method for utilizing these low movement fire resistant joint sealants is to increase the width or size of the joint opening, an undesirable and expensive alternative, to allow for a commonly required +/−50% joint movement rating.

Other systems have incorporated cover plates that span the joint itself, often anchored to the concrete or attached to the expansion joint material and which are expensive to supply and install. These systems sometimes require potentially undesirable mechanical attachment, which requires drilling into the deck or joint substrate. Cover plate systems that are not mechanically attached rely on support or attachment to the expansion joint, thereby subjecting the expansion joint seal system to continuous compression, expansion and tension on the bond line when force is applied to the cover plate, which shortens the life of the joint seal system. Some of these systems use foam to provide sealing. But these foam systems can take on a compression set when the joint seal system is repeatedly exposed to lateral forces from a single direction, such as a roadway. This becomes more pronounced as these foam systems utilize a single or continuous spine along the length of the expansion joint seal system—which propagates any deflection along the length. The problems and limitations of the current foam sealing cover plate systems that rely on a continuous spline are well known in the art.

These cover plate systems are designed to address lateral movement—the expansion and compression of adjacent panels. Unfortunately, these do no properly address vertical shifts—where the substrates become misaligned when the end of one shifts vertically relative to the other. In such situations, the components attached to the cover plate are likewise rotated in space causing a pedestrian or vehicular hazard. The current systems do no adequately address the differences in the coefficient of linear expansion between the cover plate and the substrate or allow for curved joint designs. The inability of the current art to compensate for the lateral or thermal movement of the cover plate results in failure of attachment to the cover plate or additional pressure being imposed on one half of the expansion joint system and potentially pulling the expansion joint system away from the lower substrate.

It would be an improvement to the art to provide an expansion joint seal wherein the density throughout the joint seal varies and wherein the joint seal has flexibility while maintaining some rigidity. It would be a further improvement if the expansion joint system could be integrated with a cover plate, with a rib, and/or with a load transfer body to distribute the load applied to the joint seal across a greater surface area.

SUMMARY

The present disclosure therefore meets the above needs and overcomes one or more deficiencies in the prior art. The disclosure provides a joint seal with a first body, a second body, a third body, a fourth body and a fifth body. The first body has a first body width from a first body first surface to a first body second surface at a first body bottom surface, a first body height from a first body top surface to the first body bottom surface at a first body front surface, a first body length front the first body front surface to a first body rear surface, and a first body compressibility, The second body has a second body width from a second body first surface to a second body second surface at the second body bottom surface, a second body height from a second body top surface to the second body bottom surface at a second body front surface, a second body length from the second body front surface to a second body rear surface, the second body length equal to the front body length, and a second body compressibility. The third body has a third body width from a third body first surface to a third body second surface at the third body bottom surface, a third body height from a third body top surface to the third body bottom surface at a third body front surface, third body length from the third body front surface to a third body rear surface, and a third body compressibility. The third body length is equal to the first body length. The fourth body has a fourth body width from the fourth body first surface to the fourth body second surface and a fourth body height from the fourth body top surface to a fourth body bottom surface at a fourth body front surface. The fourth body height less than the first body height and less than the second body height. The fourth body bottom surface is vertically intermediate the first body top surface and the first body bottom surface, the fourth body first surface is adjacent, and may be adhered, to the first body second surface, and the fourth body top surface vertically intermediate the first body top surface and the first body bottom surface, and the fourth body second surface is adjacent, and may be adhered, to the second body front surface. The fourth body length extend from the fourth body front surface to a fourth body rear surface and is equal to the first body length. The fourth body compressibility is less than the first body compressibility and is less than the second body compressibility. The fifth body has a fifth body width from a fifth body first surface to a fifth body second surface, a fifth body height from a fifth body top surface to a fifth body bottom surface at a fifth body front surface, where the fifth body height less than the second body height and less than the third body height. The fifth body bottom surface is vertically intermediate the second body top surface and the second body bottom surface. The fifth body first surface is adjacent, and may be adhered, to the second body second surface and the fifth body top surface is vertically intermediate the second body top surface and the second body bottom surface. The fifth body second surface is adjacent, and may be adhered, to the third body first surface. The fifth body further has a fifth body length from the fifth body front surface to a fifth body rear surface, the fifth body length equal to the first body length, and a fifth body compressibility less than the second compressibility and less than the third body compressibility. The joint seal may include a packaging body having a packaging body length from a packaging body front surface to a packaging body rear surface, where the packaging body length is equal to the first body length, and a packaging body height from a packaging body top surface to a packaging body bottom surface where the packaging body height is equal to the first body height. The packaging body first surface extends from the packaging body top surface to the packaging body bottom surface and from the packaging body front surface to the packaging body rear surface, the packaging body first surface in contact with the first body first surface.

Additional aspects, advantages, and embodiments of the disclosure will become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent, are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are therefore not to be considered limiting of its scope as the disclosure may admit to other equally effective embodiments.

In the drawings.

DETAILED DESCRIPTION

The present disclosure provides an expansion joint system. As can be appreciated, sealants, coatings, functional membranes, adhesives and other functional materials may be applied to or included within the components of the disclosure.

Figure 1:
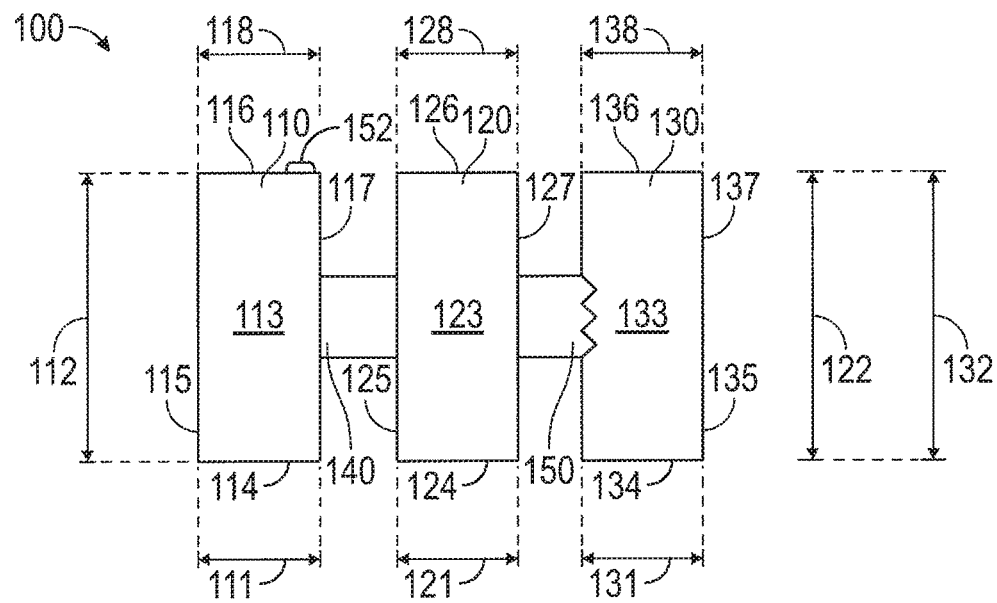
FIG. 1 illustrates an end view of a joint seal system according to the present disclosure prior to compression.

Referring to FIG. 1, an end view of a joint seal system according to the present disclosure prior to compression is illustrated. The joint seal 100 includes a first body 110, a second body 120, a third body 130, a fourth body 140, and a fifth body 150. The first body 110, the second body 120 and the third body 130 may have similar structures and properties including width, compressibility, and shape. Similarly, the fourth body 140 and the fifth body 150 may have similar structures and properties including width, compressibility, and shape.

Each of the first body 110, the second body 120, and the third body 130 has a top width at its first surface and one at its rear surface, which may be unequal. The first body 110 may include a first body top width 118 from the first body first surface 115 to the first body second surface 117 at the first body top surface 116. The second body 120 may include second body top width 128 from the second body first surface 125 to the second body second surface 127 at the second body top surface 126. The third body 130 may include a third body top width 138 from the third body first surface 135 to the third body second surface 137 at the third body top surface 136. The first body width 111, the second body width 121, and the third body width 131 may be unequal to one another or all or may be equal. Likewise, the first body top width 118, the second body top width 128 and the third body top width 138 may be unequal to one another or all. Further, where desired, the first body width 111 may be unequal to the first body top width 118 and/or the second body width 121 may be unequal to the second body top width 128 and/or the third body width 131 may be unequal to the third body top width 138.

Each of the first body 110, the second body 120, and the third body 130 has a compressibility and a density. The first body 110 may be elastically compressible and has a first body width 111 from a first body first surface 115 to a first body second surface 117 at a first body bottom surface 114, a first body height 112 from a first body top surface 116 to the first body bottom surface 114 at a first body front surface 113, a first body compressibility. The second body 120 may also be elastically compressible and has a second body width 121 from a second body first surface 125 to a second body second surface 127 at the second body bottom surface 124, a second body height 122 from a second body top surface 126 to the second body bottom surface 124 at a second body front surface 123, and a second body compressibility. The third body 130 may likewise be elastically compressible and has a third body width 131 from a third body first surface 135 to a third body second surface 137 at the third body bottom surface 134, a third body height 132 from a third body top surface 136 to the third body bottom surface 134 at a third body front surface 133, and a third body compressibility. One or more of the first body height 112, the second body height 122, and the third body height 132 may be equal or unequal. When desired, one or more of the first body 110, the second body 120, and the third body 130 may be constructed of foam. Likewise, when desired, one or more of the first body compressibility, the second body compressibility, and the third body compressibility may be equal or unequal. One or more of the first body compressibility, the second body compressibility, and the third body compressibility may have a value of zero, such that the body is entirely incompressible, provided the nearest body is compressible. Conversely, one or more of the first body 110, the second body 120, and the third body 130 may be resiliently compressible. When desired, a mix of the entirely incompressible and resiliently-compressible bodies may be employed. Alternatively, the compressibilities of the first body 110, the second body 120 and the third body 130 may be sequenced to increase, or to decrease directionally to allow for directional traffic or resistance to other lateral forces in one direction but not in the opposite.

Similarly, the densities of the first body 110, the second body 120, and/or the third body 130 may be the equal or unequal to one another.

Each of the first body 110, the second body 120, and the third body 130 has a shape, which need not be the same. Each of the first body 110, the second body 120, and the third body 130 may be a rectangular prism, or may have other shapes, and/or may be concave or convex on any surface.

The first body 110 and the third body 130 are preferably constructed of a material adapted to contact a first substrate wall and a second substrate wall while in compression. The second body 120 may be constructed of the same or of a different material. This may be a foam, a corn starch-based material, cellulose or other compressible material.

The fourth body 140 and the fifth body 150 likewise may have similar structures and properties. The fourth body 140 is positioned adjacent the first body 110 and the second body 120 and may be adhered to each of them. Alternatively, while the fourth body 140 is positioned adjacent the first body 110 and the second body 120, it may be maintained in position by the first body 110 being adhered or maintained in position relative to the second body 120. The fifth body 150 is positioned adjacent the second body 120 and the third body 130 and may be adhered to each of them. Alternatively, while the fifth body 150 is positioned adjacent the second body 120 and the third body 130, it may be maintained in position by the first body 110 being adhered or maintained in position relative to the second body 120. Each of the fourth body 140 and the fifth body 150 has a shape. Each of the fourth body 140 and the fifth body 150 may be a rectangular prism, or may have other shapes, and/or may be concave or convex on any surface.

One or more of the first body 110, the second body 120, the third body 130, the fourth body 140 and/or the fifth body 150 may be constructed of one or more pieces of foam, each with its own mechanical properties. Alternatively, one or may be a non-foam material which exhibits similar properties of compressibility, expansion, resiliency, and to support liquid-based additives, such a fire retardants and fillers. Each of the first body 110, the second body 120, the third body 130, the fourth body 140 and the fifth body 150 should preferably be composed of an elastically compressible, though materials which are not elastic and/or not compressible may be used. Whether constructed of one or pieces of the same foam or of different foams, the material selected for each of the first body 110, the second body 120, the third body 130, the fourth body 140 and the fifth body 150 has body specific properties, including a density and a spring force.

When any of the first body 110, the second body 120, the third body 130, the fourth body 140 and/or the fifth body 150 is to be constructed of foam, any of various types of foam known in the art may be, including compositions such as polyurethane and polystyrene, and may be open or closed cell. The uncompressed density of the foam may also be altered for performance, depending on local weather conditions. The density of the foam when relaxed and prior to any compression may be less 400 kg/m3. When desired, the foam may be selected of a composition which is fire retardant or water resistant.

When desired, the foam may have a treatment, such as impregnation, to increase desirable properties, such as fire resistance or water resistance, by, respectively, the introduction of a fire retardant into the foam or the introduction of a water inhibitor into the foam.

The foam of any of the first body 110, the second body 120, the third body 130, the fourth body 140 and/or the fifth body 150 may contain, such as by impregnation or infusion, a sintering material, wherein the particles in the impregnate move past one another with minimal effort at ambient temperature but form a solid upon heating. Once such sintering material is clay or a nano-clay. Such a sintering impregnate would provide an increased overall insulation value and permit a lower density at installation than conventional foams while still having a fire endurance capacity of at least one hour, such as in connection with the UL 2079 standard for horizontal and vertical joints. While the cell structure, particularly, but not solely, when compressed, of body 130 preferably inhibits the flow of water, the presence of an inhibitant or a fire retardant may prove additionally beneficial. The fire retardant may be introduced as part of the foaming process, or by impregnating, coating, infusing, or laminating, or by other processes known in the art. Further, the foam may be composed of a hydrophilic material, a hydrophobic material, a fire-retardant material, or a sintering material.

Moreover, the foam may be selected from partially closed cell or viscoelastic foams. Most prior art foams seals have been designed as "soft foam" pre-compressed foam seals utilizing low to medium density foam (about 16-30 kg/m3) and softer foam (ILD range of about 10-20). Higher density "hard" foams with high ILD's can provide an effective foam seal meeting the required waterproofing (600 Pa minimum and ideally 1000 Pa or greater) and movement and cycling requirements such as ASTM E-1399 Standard Test Method fur Cyclic Movement and Measuring the Minimum and Maximum Joint Widths of Architectural Joint Systems as well as long term joint cycling testing. An advantage has been found in using higher density and higher hardness (higher ILD) foams particularly in horizontal applications. While at first this might seem obvious it is known in the art that higher density foams that are about 32-50 kg/m$^3$ with an ILD rating of about 40 and greater tend to have other undesirable properties such as a long term decrease in fatigue resistance. Desirable properties such as elongation, ability to resist compression set, foam resiliency and fatigue resistance typically decline relative to an increase in density and ILD. These undesirable characteristics are often more pronounced when fillers such as calcium carbonate, melamine and others are utilized to increase the foam density, yet the cost advantage of the filled foam is beneficial and desirable. Similarly, when graft polyols are used in the manufacture of the base foam to increase the hardness or load carrying capabilities, other desirable characteristics of the base foam such as resiliency and resistance to compression set can be diminished. Through the testing of non-conventional impregnation binders and elastomers for pre-compressed foam sealants such as silicones, urethanes, polyureas, epoxies, and the like, it has been found that materials that have reduced tack or adhesive properties after cure and which provide a high internal recovery force can be used to counteract the long term fatigue resistance of the high density, high ILD foams. While first impregnating and curing the foam with the injected or impregnated silicone, acrylic, urethane or other low tack polymers and, ideally, elastomers with about 100-200% elongation or greater providing a sufficient internal recovery force, it may be advantageous to re-impregnate the foam with another elastomer or binder to provide a timed expansion recovery at specific temperatures. The impregnation materials with higher long-term recovery capabilities imparted to the high density, high ILD base foams, such as a silicone or urethane elastomers, can be used to impart color to the foam seal or be a clear or translucent color to retain the base foam color. If desirable a second impregnation, partial impregnation or coating can be applied to or into the foam seal to add additional functional characteristics such as UV stability, mold and mildew resistance, color, fire-resistance or fire-ratings or other properties deemed desirable to functionality to the foam.

Viscoelastic foams have not typically been commercially available or used for foam seals due to perceived shortcomings. Commonly used formulations, ratios and methods do not provide a commercially viable foam seal using viscoelastic foam when compared to standard polyurethane foams. Open cell viscoelastic foams are more expensive than polyester or polyether polyurethane foams commonly used in foam seals. Any impregnation process on a viscoelastic foam tends to proceed slower than on a traditional foam due to the fine cell structure of viscoelastic foam tends to proceed slower than on a traditional foam due to the fine cell structure of viscoelastic foam. This can be particularly frustrating as the impregnation materials and the impregnation process are typically the most expensive component of a foam seal. However, because of their higher initial density viscoelastic foams can provide better load carrying or pressure resistant foam seal. Both properties are desirable but not fully provided for in the current art for use in applications such as load carrying horizontal joints or expansion joints for secondary containment. Common densities found in viscoelastic foams are 64-80 kg/m3 or greater. Additionally, viscoelastic foams have four functional properties (density, ILD rating, temperature and time) compared to flexible polyurethane foams, which have two primary properties (density and an ILD rating).

However, the speed of recovery of viscoelastic foams following compression may be increased by reducing or eliminating any impregnation, surface impregnation or low adhesive strength impregnation compound. Incorporating fillers into the impregnation compound is known to be effective in controlling the adhesive strength of the impregnation binder and therefore the re-expansion rate of the impregnated foam. By surface impregnating or coating the outside surface of one or both sides of a viscoelastic foam to approximately 10% of the foam thickness, such as about 3-8 mm deep for conventional joint seals, the release time can be controlled and predicted based on ambient temperature. Alternatively, the foam can be infused, partially impregnated or impregnated with a functional or non-functional filler without a using binder but rather only a solvent or water as the impregnation carrier where the carrier evaporates leaving only the filler in the foam.

The re-expansion rate of a seal using viscoelastic foam may be controlled by using un-impregnated viscoelastic foam strips and re-adhering them with a pressure sensitive adhesive or hot melt adhesive. When the seal is compressed, the laminating adhesive serves as a temporary restriction to re-expansion allowing time to install the foam seal. Viscoelastic foam may be advantageously used, rather than standard polyurethane foam, for joints requiring additional softness and flexibility due to higher foam seal compression in hot climates or exposure or increased stiffness in cold temperatures when a foam seal is at its minimum compressed density. Additionally, closed cell, partially closed cell and other foams can be used as in combination with the viscoelastic foams to reduce the overall cost.

This second group of body materials, the non-foam members, may include, for example, corrugated cardboards, natural and man-made batting materials, and natural, synthetic and man-made sponge material. When desired, such materials may be selected for properties, such as water leakage, air leakage, resilience in face of one or more cycling regimes, compressibility, relaxation rate, compression set, and elasticity.

The material selected for the first body 110, the second body 120, the third body 130, the fourth body 140 and/or the fifth body 150 may be altered to provide additional functional characteristics. It may be infused, impregnated, partially impregnated or coated with an impregnation material or binder that is designed specifically to provide state of the art seal water-resistance properties with a uniform and consistent distribution of the waterproofing binder. The material may be infused or impregnated or otherwise altered to retain a fire retardant, dependent on function. Where the material is foam, any suitable open cell foam type with a density of 16-45 kg/m3 or higher can provide an effective water-resistant foam-based seal by varying the impregnation density or the final compression ratio. Where a sound resistant seal is desired, the density may provide a sound resistant seal in a similarly-rated wall from an Sound Transmission Class value from 42-63 and/or a sound reduction between 12 and 50 decibels.

The material for the first body 110, the second body 120, the third body 130, the fourth body 140 and/or the fifth body 150 may be selected from an inherently hydrophilic material or have a hydrophilic component such as a hydrophilic polymer that is uniformly distributed throughout. One or more of the first body 110, the second body 120, the third body 130, the fourth body 140 and/or the fifth body 150 may include strategically-placed surface impregnation or partially impregnate with a hydroactive polymer. Because the primary function of the first body 110, the second body 120, and the third body 130 is waterproofing, the addition of a hydrophilic function does not negatively impact any desired fire-resistant properties, as an increased moisture content in the body 130 may increase fire resistive properties.

The material of the first body 110, the second body 120, the third body 130, the fourth body 140 and/or the fifth body 150 may be formed of commercially available vapor permeable foam products or by forming specialty foams. Commercial available products which provide vapor permeable and excellent fire resistant properties are well known, such as Sealtite VP or Willseal 600. It is well known that a vapor permeable but water-resistant foam joint sealant may be produced leaving at least a portion of the cell structure open while in compression such the water vapor can escape through the impregnated foam sealant. Water is then ejected on the exterior of a body 130 because the foam, and/or any impregnation, is hydrophobic and therefore repels water. Water can escape from the foam sealant or wall cavity through water vapor pressure due to the difference in humidity creating unequal pressure between the two areas. Because the cell structure is still partially open, the vapor pressure drive is sufficient to allow moisture to return to equalization or the exterior of the structure. By a combination of compression ratio and impregnation density of a hydrophobic component the water resistance capacity can be increased to provide resistance to various levels of pressure or driving rain.

The material of the first body 110, the second body 120, the third body 130, the fourth body 140 and/or the fifth body 150 may include an impregnate, such as a fire retardant such as aluminum trihydroxide, which may be throughout its entirety or which may be only about ten percent of its body width. Additional function properties can be added by surface impregnating the exposed or outside surfaces of the foam as well as the inside portion if additional properties are desirable.

When desired, one or more of the first body 110, the second body 120, and the third body 130 may include a load transfer member 152 at, above, or immediately below the top surface of the first body 110, the second body 120, and the third body 130 and along some or all of its length and which may present any number of profiles such as a horizontally flat profile or a round profile, among others. Because of its length and width a localized load applied to the joint seal 100 may be distributed along the associated body, increasing the surface area resisting the force and reducing the force at any one location.

Figure 2:
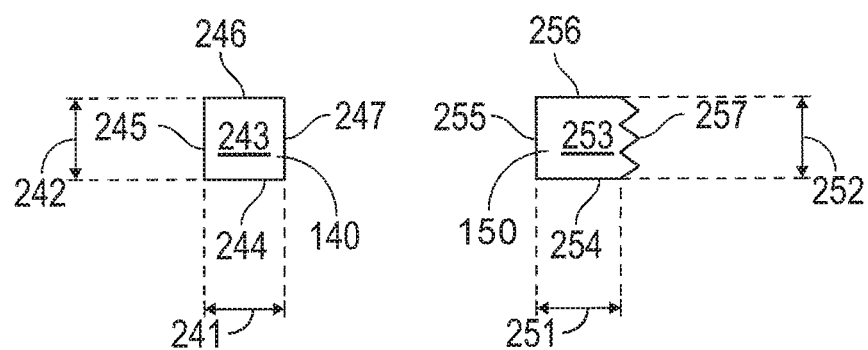
FIG. 2 illustrates end views of the fourth and fifth bodies of the joint seal system according to the present disclosure.

Referring to FIG. 2, end views of the fourth and fifth bodies of the joint seal system according to the present disclosure are illustrated. The fourth body 140 has a fourth body width 241 from the fourth body first surface 245 to the fourth body second surface 247 and a fourth body height 242 from the fourth body top surface 246 to a fourth body bottom surface 244 at a fourth body front surface 243. The fifth body 150 has a fifth body width 251 from a fifth body first surface 255 to a fifth body second surface 257 and a fifth body height 252 from a fifth body top surface 256 to a fifth body bottom surface 254 at a fifth body front surface 253.

Referring to FIGS. 1 and 2, the fourth body height 242 may be less than the first body height 112 and less than the second body height 122. The fourth body bottom surface 244 may be vertically intermediate the first body top surface 116 and the first body bottom surface 114, and the fourth body top surface 246 may be vertically intermediate the first body top surface 116 and the first body bottom surface 114. While the fourth body 140 may be retained within the first body 110 and the second body 120, the fourth body bottom surface 244 may be below the first body bottom surface 114 and/or the fourth body top surface 246 may be above the first body top surface 116. Further, the fourth body first surface 245 may be adhered to the first body second surface 117 and the fourth body second surface 247 adhered to the second body first surface 125. Similarly, the fifth body height 252 may be less than the second body height 122 and may be less than the third body height 132. The fifth body bottom surface 254 may be vertically intermediate the second body top surface 126 and the second body bottom surface 124 and the fifth body top surface 256 vertically intermediate the second body top surface 126 and the second body bottom surface 124. While the fifth body 150 may be retained within the second body 120 and the third body 130, the fifth body bottom surface 254 may be below the second body bottom surface 124 and/or the fifth body top surface 256 may be above the second body top surface 126. The fourth body top surface 246 may be misaligned, i.e. above or below, the fifth body top surface 256 or may be aligned with it. Further, the fifth body first surface 255 may be adhered to the second body second surface 127 and the fifth body second surface 257 may be adhered to the third body first surface 135. When desired, one or more of the group consisting of the first body second surface 117, the second body first surface 125, the second body second surface 127, a third body first surface 135, the fifth body first surface 255 and the fifth body second surface 257 may provide an irregular surface which may increase the bond between the two adjacent bodies and reduce the potential for movement.

When desired, one or more of the fourth body compressibility and the third body compressibility may be equal or unequal, but each is less compressible than the adjacent body. One ore more of the fourth body compressibility and the fifth body compressibility may have a value of zero, such that the body is entirely incompressible. Similarly, the densities of the fourth body 140 and the fifth body 150 may be the equal or unequal to one another.

Figure 3:
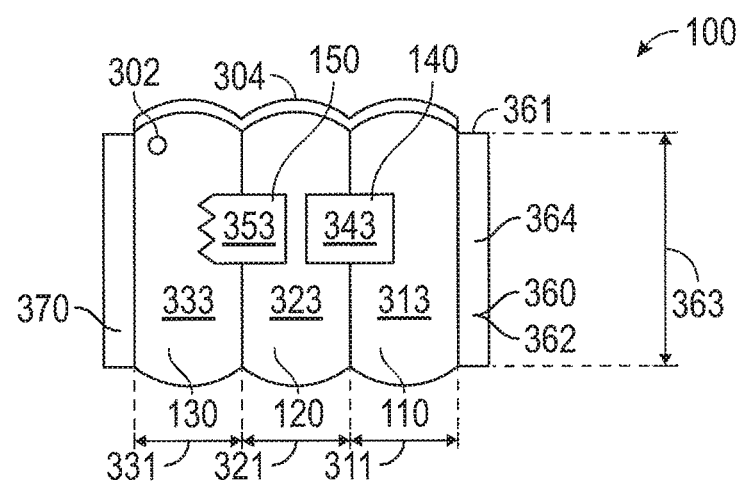
FIG. 3 illustrates and end view of a joint seal system according to the present disclosure in compression with packaging bodies.

Referring to FIG. 3, an end view of a joint seal system according to the present disclosure in compression with packaging bodies is illustrated. The first body 110 has a first body rear surface 313 wile the second body 120 has a second body rear surface 323, and the third body 130 has a third body rear surface 333. Similarly, the fourth body 140 has a fourth body rear surface 343 and the fifth body 150 has a fifth body rear surface 353. Further included with the joint seal 100 is a packaging body 360, with a packaging body rear surface 364 and a packaging body height 363 from a packaging body top surface 361 to a packaging body bottom surface 362, and a second packaging body 370. As the fourth body compressibility is less than the first body compressibility and less than the second body compressibility, compression of the portions of the first body 110 and the second body 120 surrounding the fourth body 140 causes localized areas of higher density in those bodies. Similarly, as the fifth body compressibility is less than the second compressibility and less than the third body compressibility, compression of the portions of the second body 120 and the third body 130 surrounding the fifth body 150 causes localized areas of higher density in those bodies.

When desired the joint seal 100 may further include a sensor 302 in any of the first body 110, the second body 120, the third body 130, the fourth body 140, and/or the fifth body 150 or in contact with any other component of the joint seal 100. The sensor may be a radio frequency identification device (RFID), transponder, or other wirelessly transmitting sensor. A sensor may be beneficial to assess the health of a joint seal 100 without accessing the interior of the expansion joint, otherwise accomplished by removal of the cover plate. It may identify when a failure occurs and thus provide an integral failure detection system. The failure detection system may be continuously or intermittently monitored and may provide feedback by powered, radio or inductive methods which may have an active or passive feedback system. It may alternatively provide environmental data, including air or water contamination. Such sensors are known in the art, and which may provide identification of circumstances such as moisture penetration and accumulation. The inclusion of a sensor in the joint seal 100 may be particularly advantageous in circumstances where the joint seal 100 is concealed after installation, particularly as moisture sources and penetration may not be visually detected. Thus, by including a low cost, moisture-activated or sensitive sensor at a bottom surface, the user can scan the joint seal 100 for any points of weakness due to water penetration. A heat sensitive sensor may also be positioned within the joint seal 100, thus permitting identification of actual internal temperature, or identification of temperature conditions requiring attention, such as increased temperature due to the presence of fire, external to the joint or even behind it, such as within a wall. Such data may be particularly beneficial in roof and below grade installations where water penetration is to be detected as soon as possible.

Inclusion of a sensor in the joint seal 100 may provide substantial benefit for information feedback and potentially activating alarms or other functions within the joint seal 100 or external systems. Fires that start in curtain walls are catastrophic. High and low-pressure changes have deleterious effects on the long-term structure and the connecting features. Providing real time feedback and potential for data collection from sensors, particularly given the inexpensive cost of such sensors, in those areas and particularly where the wind, rain and pressure will have their greatest impact would provide benefit. While the pressure on the wall is difficult to measure, for example, the deflection in a precompressed sealant is quite rapid and linear. Additionally, joint seals are used in interior structures including but not limited to bio-safety and cleanrooms. Additionally, a sensor could be selected which would provide details pertinent to the state of the Leadership in Energy and Environmental Design (LEED) efficiency of the building. Additionally, such a sensor, which could identify and transmit air pressure differential data, could be used in connection with masonry wall designs that have cavity walls or in the curtain wall application, where the air pressure differential inside the cavity wall behind the cavity wall is critical to maintaining the function of the system. A sensor may be positioned in other locations within the joint seal 100 to provide beneficial data. A sensor may be positioned within any of the first body 110, the second body 120, the third body 130, the fourth body 140, and/or the fifth body 150 at, or near, its top surface to provide prompt notice of detection of heat outside typical operating parameters, so as to indicate potential fire or safety issues. Such a positioning would be advantageous in horizontal of confined areas. A sensor so positioned might alternatively be selected to provide moisture penetration data, beneficial in cases of failure or conditions beyond design parameters. The sensor may provide data on moisture content, heat or temperature, moisture penetration, and manufacturing details. A sensor may provide notice of exposure from the surface of the joint seal 100 most distant from the base of the joint. A sensor may further provide real time data. Using a moisture sensitive sensor in the joint seal 100 and at critical junctions/connections would allow for active feedback on the waterproofing performance of the joint seal 100. It can also allow for routine verification of the watertightness with a hand-held sensor reader to find leaks before the reach occupied space and to find the source of an existing leak. Often water appears in a location much different than it originates making it difficult to isolate the area causing the leak. A positive reading from the sensor alerts the property owner to the exact location(s) that have water penetration without or before destructive means of finding the source. The use of a sensor in the joint seal 100 is not limited to identifying water intrusion but also fire, heat loss, air loss, break in joint continuity and other functions that cannot be checked by non-destructive means. Use of a sensor on or within any of the first body 110, the second body 120, the third body 130, the fourth body 140, and/or the fifth body 150 or any other part of the joint seal 100 may provide a benefit over the prior art. Impregnated foam materials, which may be used for any of the first body 110, the second body 120, the third body 130, the fourth body 140, and/or the fifth body 150, are known to cure fastest at exposed surfaces, encapsulating moisture remaining inside the body, and creating difficulties in permitting the removal of moisture from within the body. While heating is a known method to addressing these differences in the natural rate of cooling, it unfortunately may cause degradation of the foam in response. Similarly, while forcing air through the foam bodies may be used to address the curing issues, the potential random cell size and structure impedes airflow and impedes predictable results. Addressing the variation in curing is desirable as variations affect quality and performance properties. The use of a sensor within or on the joint seal 100 may permit use of the heating method while minimizing negative effects. The data from the sensors, such as real-time feedback from the heat, moisture and air pressure sensors, aids in production of a consistent product. Moisture and heat sensitive sensors aid in determining and/or maintaining optimal impregnation densities, airflow properties of the foam during the curing cycle of the foam impregnation. Placement of the sensors into foam at the pre-determined different levels allows for optimum curing allowing for real time changes to temperature, speed and airflow resulting in increased production rates, product quality and traceability of the input variables to that are used to accommodate environmental and raw material changes for each product lots.

Likewise, the joint seal 100 may include a flexible barrier 304 adhered to the first body top surface 116, the second body top surface 126 and the third body top surface 136. The flexible barrier 304 may be selected from liquid applied materials, such as a silicone sealant and thereby applied as a coating or may be solid material, on elastomer sheet, or a plastic sheeting. Beneficially, because the flexible barrier 304 may provide fire resistance, the present disclosure provides for an expansion joint sealant without the need to impregnate one or more of the first body 110, the second body 120, the third body 130, the fourth body 140, and/or the fifth body 150 with a fire retardant.

The flexible barrier 304 may provide water resistance and/or fire retardancy selected to provide to slow the spread of fire. The flexible barrier 304 may undergo chemical reaction when heated to reduce flammability or delay combustion or cool through physical action or endothermic reactions. The flexible barrier 304 may provide retardancy through endothermic degradation, such as by use of aluminum hydroxide. The flexible barrier 304 may provide retardancy through thermal shielding, such as by use of an intumescent, which chars over when burned, separating the flame from the material and slowing heat transfer. The flexible barrier 304 may provide retardancy by gas phase radical quenching, such as when chlorinated paraffin undergoes thermal degradation and releases hydrogen chloride to lower potential propagation of combustion reactions.

Where the flexible barrier 304 is a solid layer it may incorporate a membrane, such as vapor impermeable layer, for further benefits. Such a flexible barrier 304 provides a barrier to foreign matter penetrating through the joint seal 100 and to opposing surface of the joint, thus ensuring some portion of the first body 110, the second body 120, the third body 130, the fourth body 140, and the fifth body 150 are not susceptible to contaminants and therefore continue to function. As the first body 110, the second body 120, the third body 130, the fourth body 140, and the fifth body 150 may be composed of a vapor permeable foam, such a composition becomes particularly beneficial when a barrier or membrane is present. The flexible barrier 304 may thus may retain and then expel moisture, preventing moisture from penetrating in an adjacent substrate. The flexible barrier 304 may be intumescent or may otherwise provide fire retardancy in the joint seal 100. Consistent with uses known in the art, the present disclosure may be associated with a central non-conductive spine and cover plate assembly for those uses wherein high traffic is anticipated, as well as for compliance with Department of Transportation requirements. The present invention may be adapted for use with other expansion joint systems, such those that incorporate a rib or spline within or connection to a body such as core bodies and attached or associated, permanently or detachably with a cover plate.

The flexible barrier 304 may include an insulating layer, such as a silicate, to add a refractory of insulating function. However, such a layer, unless otherwise selected, would not be a fire-retardant liquid glass formulation. Among such uses, the first body top surface 116, the second body top surface 126 and/or the third body top surface 136 may be coated or partially coated with a flexible or semi-rigid elastomer to increase load carrying capability which is further enhanced by the supporting intumescent members. These, or other coatings, may be used to provide waterproofing, fire resistance, or additional functional benefits.

When desired, the flexible barrier 304 may be positioned through one or more of the first body 110, the second body 120, the third body 130, the fourth body 140, and the fifth body 150, preferably from a first side through to a second side, particularly where the flexible barrier is a solid sheet. Alternatively, separate barriers 304 may be positioned through each of the first body 110, the second body 120, the third body 130, the fourth body 140, and the fifth body 150, preferably from a first side through to a second side. When desired, a barrier 304 may be positioned between any of the two adjacent bodies.

Preferably, each of the first body 110, the second body 120, and the third body 130 is configured for compression. The first body 110 is configured for compression to a first body compressed width 311. The first body width 111 may be at least three times the first body compressed width 311. The second body 120 is configured for compression to a second body compressed width 321. The second body width 121 may be at least three times the second body compressed width 321. The third body 130 is configured for compression to a third body compressed width 331. The third body width 131 may be at least three times the third body compressed width 331.

Referring to FIGS. 1 and 3, the relationship and sizes of the first body 110, second body 120 and third body 130 is illustrated. The packaging body height 363 may be equal to the first body height 122. The first body 110 may have a first body secondary height from a first body top surface 116 to the first body bottom surface 114 at a first body rear surface 313. The second body 120 may have a second body secondary height from a second body top surface 126 to the second body bottom surface 124 at a second body rear surface 323. The third body 130 may have a third body secondary height from a third body top surface 136 to the third body bottom surface 134 at a third body rear surface 333. The first body height 112 and the first body secondary height may be equal or unequal. The second body height 122 and the second body secondary height may be equal or unequal. The third body height 132 and the third body secondary height may be equal or unequal. As a result, the joint seal 100 may provide for increasing, or decreasing, depth along its run which may be beneficial there the bottom of the joint increases relative to the top of the adjacent substrates, panels or other surfaces.

When desired, one or more of the first body front surface 113, second body front surface 123, third body front surface 133, fourth body front surface 143, and fifth body front surface 153 may be provided with profiles which permit the positioning of and interlocking to an adjacent joint seal 100, spell as by a stepped or "keying" profile where some portion of the first body front surface 113, second body front surface 123, third body front surface 133, fourth body front surface 143, and fifth body front surface 153 extends outward to mate to a counterpart shape on a first body rear surface 313, second body rear surface 323, third body rear surface 333, fourth body rear surface 343, and fifth body rear surface 353.

Referring to FIGS. 1, 2 and 3, the relationship and sizes of the fourth body 140 and fifth body 150 is illustrated. The fourth body 140 may have a fourth body secondary height from a fourth body top surface 246 to the fourth body bottom surface 244 at a fourth body rear surface 343. The fifth body 150 may have a fifth body secondary height from a fifth body top surface 226 to the fifth body bottom surface 254 at a fifth body rear surface 353. The fourth body height 242 and the fourth body secondary height may be equal or unequal. The fifth body height 252 and the fifth body secondary height may be equal or unequal. As a result, the joint seal 100 may provide for increasing, or decreasing, depth along its run, which may be beneficial there the bottom of the joint increases relative to the top of the adjacent substrates, panels or other surfaces.

Figure 4:
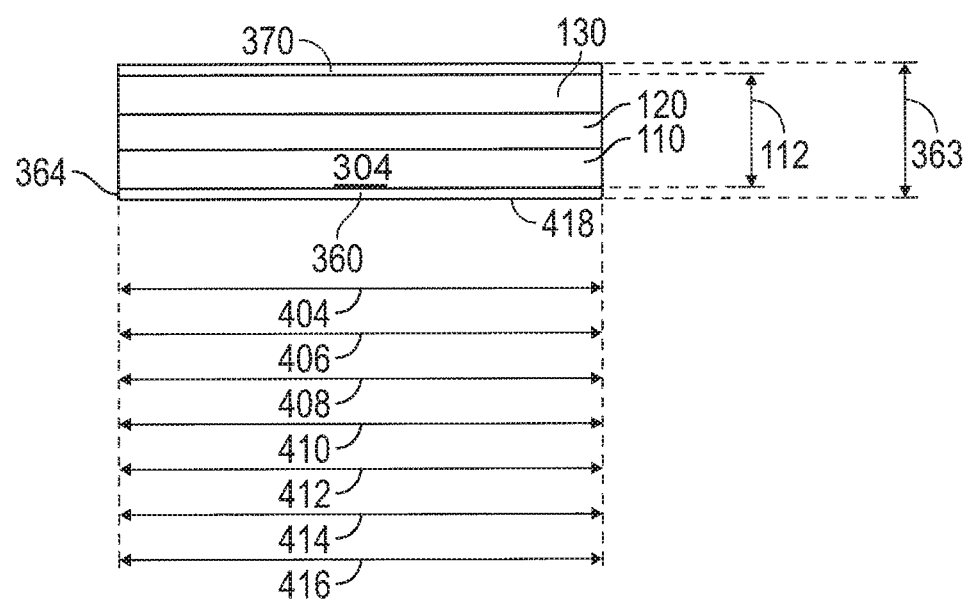
FIG. 4 illustrates a top view of a joint seal system according to the present disclosure in compression with packaging bodies.

Referring to FIG. 4, a top view of a joint seal system according to the present disclosure in compression with packaging bodies is illustrated. Each of the first body 110, the second body 120, the third body 130, the fourth body 140, the fifth body 150 the packaging body 360 and the second packaging body 370 have a length. The first body 110 has a first body length 404 from the first body front surface 113 to the first body rear surface 313. The second body 120 has a second body length 406 from the second body front surface 123 to the second body rear surface 323, which second body length 406 may be equal to the front body length 404. The third body 130 has a third body length 408 from the third body front surface 133 to the third body rear surface 333, which the third body length 408 may be equal to the first body length 404. The fourth body 140 has a fourth body length 410 from the fourth body front surface 243 to the fourth body rear surface 343, the fourth body length 410 may be equal to the first body length 404. The fifth body 150 has a fifth body length 412 from the fifth body front surface 253 to the fifth body rear surface 353, which fifth body length 412 may be equal to the first body length 404. Similarly, the packaging body 360 may have a packaging body length 414 from a packaging body front surface 418 to the packaging body rear surface 364, which packaging body length 414 may be equal to the first body length 404. When a second packaging body 370 is provided, the second packaging body 370 may have a second packaging body length 416 equal to the packaging body length 414.

Figure 5:
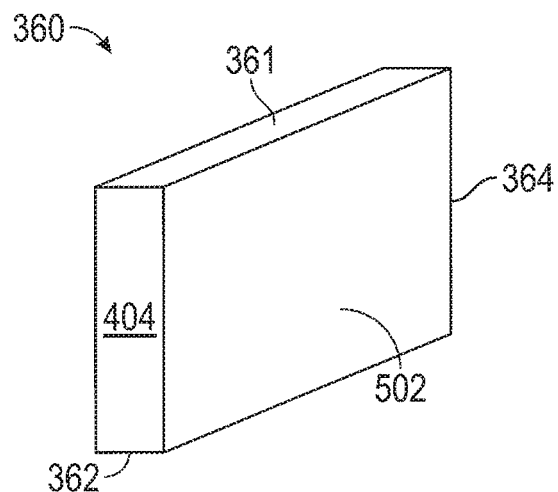
FIG. 5 illustrates an isometric view of a packaging body.

Referring to FIG. 5, an isometric view of a packaging body is provided. The packaging body 360 has a packaging body first surface 502 from the packaging body top surface 361 to the packaging body bottom surface 362 and from the packaging body front surface 418 to the packaging body rear surface 364, the packaging body first surface 502 in contact with the first body first surface 115. As an adhesive may be applied to the first body first surface 115 as aid in attachment to the substrate at installation, the packaging body first surface 502 may provide a surface to which the adhesive will not adhere. Similarly, where a second packaging body 370 it may likewise have a surface to which an adhesive applied to the third body second surface 137 will not adhere.

Figure 6:
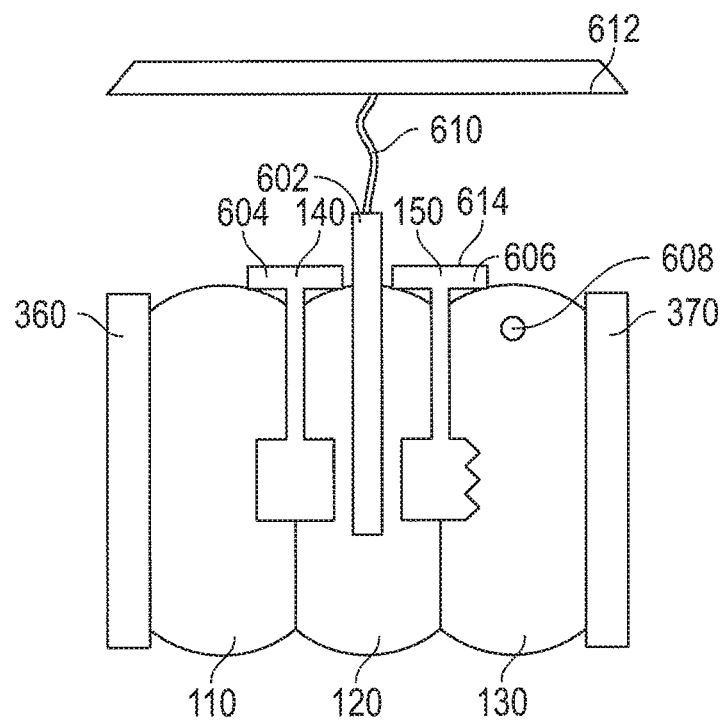
FIG. 6 illustrates an end view of a joint system having a rib and tethered cover plate and wherein the fourth body and the fifth body each present a T-extension for load transfer is illustrated.

Referring to FIG. 6, an end view of a joint seal 100 having a rib 602 and connected by a flexible tether 610 to a cover plate 612 and wherein the fourth body 140 and the fifth body 150 each presenting a T-extension 604, 606 or load transfer is provided. When a cover plate 612 is used, it may be tethered to the rib 602 or may be directly connected to the rib 602, whether by a fixed connection so the two components function as a single unit or one which permits movement, such as a hinge or sliding connection to permit some variation in orientation or position. The rib 602 penetrates into one of the first body 110, the second body 120, the third body 130, the fourth body 140, or the fifth body 150 to a depth sufficient to retain the rib 602 and to resist deflection of the rib 602 from above and to cause deflection of the rib 602 due to substrate movement. An intumescent rod, sphere, or body 608 may be positioned, driven, or injected into one of the first body 110, the second body 120, the third body 130, the fourth body 140, or the fifth body 150 to provide fire retardancy and load transfer when desired.

The construction of the rib 602 may be selected for mechanical properties. The rib 602 may be constructed of a durable material, such as metal, carbon fiber, or plastics and may be constructed in one or in multiple pieces, which may permit greater flexing or which may permit attachment and contact with the cover plate 612 at one diameter and with one of the first body 110, the second body 120, the third body 130, the fourth body 140, and the fifth body 150 at a different diameter. The rib 602 may be flat, curved or pointed. The rib 602 may be positioned through the top and into the body of one or more of the first body 110, the second body 120, the third body 130, the fourth body 140, and the fifth body 150. The rib 602 may be used as a structural support, limiting and resisting localized lateral movement of the body in relation to substrate movement or in response to the force applied to any connected cover plate 612, which may be made greater by a flexible tether 610 connecting the rib 602 to the cover plate 612. The flexible tether 610 may likewise be constructed to obtain desirable mechanical properties. The flexible tether 610 may be a sheet or strip of sufficient length to permit some movement before the transfer of force by the flexible tether 610 to the rib 602 or the cover plate 612.

Alternatively, or in addition, the fourth body 140 and the fifth body 150 may each present a T-shaped extension 604, 606 for load transfer, where the fourth body 140 have a T-shaped shaped extension 604 which extends from the fourth body top surface 246 to terminate above the first body top surface 116 and the second body top surface 126. The t-shaped top permits any load applied to the t-shaped extension top 614 to be distributed along the length of the t-shaped extension 604, which may be all or some portion of the first body length 404.

The design of the cover plate 612 may provide benefits. The cover plate 612 is preferably made of a material sufficiently resilient to sustain and be generally undamaged by the surface traffic atop it for a period of at least five (5) years and of a material and thickness sufficient to transfer any loads to the substrates which it contacts and may have limited compressibility. The cover plate 110 may be provided to present a solid, generally impermeable surface, or may be provided to present a permeable surface. To perform its function when positioned atop the expansion joint, and to provide a working surface, the cover plate typically is wider than width of the joint. Regardless of the intended position, the cover plate 614 may be constructed without restriction as to its profile. The cover plate 612 may be constructed of a single plate or may be constructed of multiple cover plate layers, providing a wear surface on its top, which may be removable, and enabling repair or replacements of wear surfaces without replacing the entire cover plate 612. Multiple layers may be advantageous in environments wherein the cover plate will be subjected to strikes, such as by snow plow or where the material of cover plate 612 may suffer from environmental exposure, such as in desert conditions. Each layer is selected from a durable material which may be bonded or adhered to an adjacent layer, but which may be separated by the adjacent layer upon the desired minimum lateral force. In some cases, it may be beneficial for the cover plate 612 to include a hinged ramp to provide a surface adjustment should the substrates become unequal in vertical position, such as if one substrate is lifted upward. A hinged ramp ensures that a usable surface is retained, even when the substrates cease to be co-planer, from the first substrate, to the cover plate 612, through to the second substrate. The cover plate 612 may also be sized for imposition into a concrete or polymer nosing, allowing for a generally-flat surface for snow plowing. The cover plate 612 may be affixed to the first substrate and/or the second substrate at the substrates surface or any point below. The cover plate may be narrower than the width of the joint so the cover plate 612 may be installed flush or below the top of a substrate and/or installed slush or below the surface of substrate. The contact point for cover plate 612 may be the deck or wall substrate or may be a polymer or elastomeric material to reduce wear and to facilitate the movement function of the cover plate 612.

Other variations may be employed. The joint seal 100 may be constructed to withstand a hydrostatic pressure equal to or greater than 29.39 psi. Environmentally friendly foam, fillers, binders, elastomer and other components may be selected to meet environmental, green and energy efficiency standards. One or more of the first body 110, the second body 120, the third body 130, the fourth body 140, and the fifth body 150 may exhibit auxetic properties to provide support or stability for the joint seal 100 as it thermally cycles or to provide additional transfer loading capacity. Auxetic properties may be provided by the body material, the internal components such as the members/membrane or by an external mechanical mechanism. The associated body from the first body 110, the second body 120, the third body 130, the fourth body 140, and the fifth body 150 may have a rigid or semi-rigid central core equal to 5-65% of the width of the associated body. Such a body may have a central core rigid through normal joint cycling, typically +/31 25%, but collapsible under seismic (+/−50%) joint cycling. Such a body may have a central core both rigid and collapsible and coupled with a data feedback system where sensors collect data and supplies information to be stored internally or externally.

By the selection of components providing resiliency, compressibility, water -resistance and fire resistance, the joint seal 100 may be constructed to provide sufficient characteristics to obtain fire certification under any of the many standards available. In the United States, these include ASTM International's E 814 and its parallel Underwriter Laboratories UL 1379 "Fire Tests of Through-penetration Firestops," ASTM International's E1966 and its parallel Underwriter Laboratories UL 2079 "Tests for Fire-Resistance Joint Systems," ASTM International's E 2307 "Standard Test Method for Determining Fire Resistance of Perimeter Fire Barrier Systems Using Intermediate-Scale, Multistory Test Apparatus, the tests known as ASTM E 84, UL 723 and NFPA 255 "Surface Burning Characteristics of Building Materials," ASTM E 90 "Standard Practice for Use of Sealants in Acoustical Applications," ASTM E 119 and its parallel UL 263 "Fire Tests of Building Construction and Materials," ASTM E 136 "Behavior of Materials in a Vertical Tube Furnace at 750° C." (Combustibility), ASTM E 1399 "Tests for Cyclic Movement of Joints," ASTM E 595 "Tests for Outgassing in a Vacuum Environment," ASTM G 21 "Determining Resistance of Synthetic Polymeric Materials to Fungi." Some of these test standards are used in particular applications where firestop is to be installed.

Most of these use the Cellulosic time/temperature curve, described by the known equation $T=20+345*LOG(8*t+1)$ where t is time, in minutes, and T is temperature in degrees Celsius including E 814/UL 1379 and E 1966/UL 2079.

E 814/UL 1379 tests a fire retardant system for fire exposure, temperature change, and resilience and structural integrity after fire exposure (the latter is generally identified as "the Hose Stream test"). Fire exposure, resulting in an F [Time] rating, identifies the time duration—rounded down to the last completed hour, along the Cellulosic curve before flame penetrates through the body of the system, provided the system also passes the hose stream test. Common F ratings include 1, 2, 3 and 4 hours but up to 8 hours may be required. Temperature change, resulting in a T [Time] rating, identifies the time for the temperature of the unexposed surface of the system, or any penetrating object, to rise 181° C. above its initial temperature, as measured at the beginning of the test. The rating is intended to represent how long it will take before a combustible item on the non-fireside will catch on fire from heat transfer. In order for a system to obtain a UL 1379 listing, it must pass both the fire endurance (F rating) and the Hose Stream test. The temperature data is only relevant where building codes require the T to equal the F-rating.

When required, the Hose Steam test is performed after the fire exposure test is completed, In some tests, such as UL 2079, the Hose Stream test is required with wall-to-wall and head-of-wall joints, but not others. This test assesses structural stability following fire exposure as fire exposure may affect air pressure and debris striking the fire-resistant system. The Hose Stream uses a stream of water. The stream is to be delivered through a 64 mm hose and discharged through a National Standard playpipe of corresponding size equipped with a 29 mm discharge tip of the standard-taper, smooth-bore pattern without a shoulder at the orifice consistent with a fixed set of requirements;

| Hourly Fire Rating Time in Minutes | Water Pressure (kPa) | Duration of Hose Stream Test (sec./m$^2$) |
| --- | --- | --- |
| 240 ≤ time < 480 | 310 | 32 |
| 120 ≤ time < 240 | 210 | 16 |
| 90 ≤ time < 120 | 210 | 9.7 |
| time < 90 | 210 | 6.5 |

The nozzle orifice is to be 6.1 m from the center of the exposed surface of the joint system if the nozzle is so located that, when directed at the center, its axis is normal to the surface of the joint system. If the nozzle is unable to be so located, it shall be on a line deviating not more than 30° from the line normal to the center of the joint system. When so located its distance from the center of the joint system is to be less than 6.1 m by an amount equal to 305 mm for each 10° of deviation from the normal. Some test systems, including UL 1379 and UL 2079 also provide for air leakage and water leakage tests, where the rating is made in conjunction with a L and W standard. These further ratings, while optional, are intended to better identify the performance of the system under fire conditions.

When desired, the Air Leakage Test, which produces an L rating and which represents the measure of air leakage through a system prior to fire endurance testing, may be conducted. The L rating is not pass/fail, but rather merely a system property. For Leakage Rating test, air movement through the system at ambient temperature is measured. A second measurement is made after the air temperature in the chamber is increased so that it reaches 177° C. within 15 minutes and 204° C. within 30 minutes. When stabilized at the prescribed air temperature of 204±5° C., the air flow through the air flow metering system and the test pressure difference are to be measured and recorded. The barometric pressure, temperature and relative humidity of the supply air are also measured and recorded. The air supply flow values are corrected to standard temperature and pressure (STP) conditions for calculation and reporting purposes. The air leakage through the joint system at each temperature exposure is then expressed as the difference between the total metered air flow and the extraneous chamber leakage. The air leakage rate through the joint system is the quotient of the air leakage divided by the overall length of the joint system in the test assembly.

When desired, the Water Leakage Test produces a W pass-fail rating and which represents an assessment of the watertightness of the system, can be conducted. The test chamber for or the test consists of a well-sealed vessel sufficient to maintain pressure with one open side against which the system is sealed and wherein water can be placed in the container. Since the system will be placed in the test container, its width must be equal to or greater than the exposed length of the system. For the test, the test fixture is within a range of 10 to 32° C. and chamber is sealed to the test sample. Nonhardening mastic compounds, pressure-sensitive tape or rubber gaskets with clamping devices may be used to seal the water leakage test chamber to the test assembly. Thereafter, water, with a permanent dye, is placed in the water leakage test chamber sufficient to cover the systems to a minimum depth of 152 mm. The top of the joint system is sealed by whatever means necessary when the top of the joint system is immersed under water and to prevent passage of water into the joint system. The minimum pressure within the water leakage test chamber shall be 1.3 psi applied for a minimum of 72 hours. The pressure head is measured at the horizontal plane at the top of the water seal. When the test method requires a pressure head greater than that provided by the water inside the water leakage test chamber, the water leakage test chamber is pressurized using pneumatic or hydrostatic pressure. Below the system, a white indicating medium is placed immediately below the system. The leakage of water through the system is denoted by the presence of water or dye on the indicating media or on the underside of the test sample. The system passes if the dyed water does not contact the white medium or the underside of the system during the 72-hour assessment.

Another frequently encountered classification is ASTM E-84 (also found as UL 723 and NFPA 255), Surface Burning Characteristics of Burning Materials. A surface burn test identifies the flame spread and smoke development within the classification system. The lower a rating classification, the better fire protection afforded by the system. These classifications are determined as follows:

| Classification | Flame Spread | Smoke Development |
|---|---|---|
| A | 0-25 | 0-450 |
| B | 26-75 | 0-450 |
| C | 76-200 | 0-450 |

UL 2079, Tests for Fire Resistant of Building Joint Systems, comprises a series of tests for assessment for fire resistive building joint system that do not contain other unprotected openings, such as windows and incorporates four different cycling test standards, a fire endurance test for the system, the Hose Stream test for certain systems and the optional air leakage and water leakage tests. This standard is used to evaluate floor-to-floor, floor-to-wall, wall-to-wall and top-of-wall (head-of-wall) joints for fire-rated construction. As with ASTM E-814, UL 2079 and E-1966 provide, in connection with the fire endurance tests, use of the Cellulosic Curve. UL 2079/E-1966 provides for a rating to the assembly, rather than the convention F and T ratings. Before being subject to the Fire Endurance Test, the same as provided above, the system is subjected to its intended range of movement, which may be non. These classifications are:

| Movement Classification (if used) | Minimum number of cycles | Minimum cycling rate (cycles per minute) | Joint Type (if used) |
|---|---|---|---|
| No Classification | 0 | 0 | Static |
| Class I | 500 | 1 | Thermal Expansion/Contraction |
| Class II | 500 | 10 | Wind Sway |
| Class III | 100 | 30 | Seismic |
|  | 400 | 10 | Combination |

ASTM E 2307, Standard Test Method for Determining Fire Resistance of Perimeter Fire Barrier Systems Using Intermediate-Scale, Multi-story Test Apparatus, is intended to test for a systems ability to impede vertical spread of fire from a floor of origin to that above through the perimeter joint, the joint installed between the exterior wall assembly and the floor assembly. A two-story test structure is used wherein the perimeter joint and wall assembly are exposed to an interior compartment fire and a flame plume from an exterior burner. Test results are generated in F-rating and T-rating. Cycling of the joint may be tested prior to the fire endurance test and an Air Leakage test may also be incorporated.

The expansion joint seal 100 may therefore perform wherein the bottom surface first body bottom surface 114, second body bottom surface 124, and third body bottom surface 134 at a maximum joint width increases no more than 181° C. after sixty minutes when the joint seal is exposed to heating according to the equation $T=20+345*LOG(8*t+1)$, where t may be time in minutes and T may be temperature in C.

The joint seal 100 may also perform wherein the third core body bottom surface 132, having a maximum joint width of more than six (6), increases no more than 139° C. after sixty minutes when the joint seal 100 is exposed to heating according to the equation $T=20+345*LOG(8*t+1)$, where t may be time in minutes and T may be temperature in C.

The joint seal 100 may be adapted to be cycled one of 500 times at 1 cycle per minute, 500 times at 10 cycles per minute and 100 cycles at 30 times per minute, without indication of stress, deformation or fatigue.

In other embodiments, the joint seal 100 is configured to pass hurricane force testing to TAS 202/203. Further the joint seal 100 may be designed or configured to pass ASTM E-282, E-331, E-330, E-547 or similar testing to meet the pressure cycling and water resistance requirements up to 5000 Pa or more.

As can be appreciated, the foregoing disclosure may incorporate or be incorporated into other expansion joint systems, such as those with fire retardant members in a side of the body adjacent the substrate, the inclusion of a separate barrier within the body and which may extend beyond the body or remain encapsulated within, one or more longitudinal load transfer members atop or within the body, without or without support members, a cover plate, a spline or ribs tied to the cover plate whether fixedly or detachably, use of auxetic materials, or constructed to obtain a fire endurance rating or approval according to any of the tests known in the United States and Europe for use with expansion joint systems, including fire endurance, movement classification(s), load bearing capacity, air penetration and water penetration.

The foregoing disclosure and description is illustrative and explanatory thereof. Various changes in the details of the illustrated construction may be made within the scope of the appended claims without departing from the spirit of the invention. The present invention should only be limited by the following claims and their legal equivalents.

I claim:

1. A joint seal, comprising
   a first body, the first body having a first body width from a first body first surface to a first body second surface at a first body bottom surface, a first body height from a first body top surface to the first body bottom surface at a first body front surface, a first body length from the first body front surface to a first body rear surface, and a first body compressibility;
   a second body, the second body having a second body width from a second body first surface to a second body second surface at a second body bottom surface, a second body height from a second body top surface to the second body bottom surface at a second body front surface, a second body length from the second body front surface to a second body rear surface, the second body length equal to the first body length, and a second body compressibility;
   a third body, the third body having a third body width from a third body first surface to a third body second surface at a third body bottom surface, a third body height from a third body top surface to the third body bottom surface at a third body front surface, a third body length from the third body front surface to a third body rear surface, the third body length equal to the first body length, and a third body compressibility;
   a fourth body, the fourth body having a fourth body width from a fourth body first surface to a fourth body second surface, a fourth body height from a fourth body top surface to a fourth body bottom surface at a fourth body front surface, the fourth body height less than the first body height and less than the second body height, the fourth body bottom surface vertically intermediate the first body top surface and the first body bottom surface, the fourth body first surface adhered to the first body second surface, the fourth body top surface vertically intermediate the first body top surface and the first body bottom surface, the fourth body second surface adhered to the second body first surface, a fourth body length from the fourth body front surface to a fourth body rear surface, the fourth body length equal to the first body length, and a fourth body compressibility less than the first body compressibility and less than the second body compressibility;
   a fifth body, the fifth body having a fifth body width from a fifth body first surface to a fifth body second surface, a fifth body height from a fifth body top surface to a fifth body bottom surface at a fifth body front surface, the fifth body height less than the second body height and less than the third body height, the fifth body bottom surface vertically intermediate the second body top surface and the second body bottom surface, the fifth body first surface adhered to the second body second surface, the fifth body top surface vertically intermediate the second body top surface and the second body bottom surface, the fifth body second surface adhered to the third body first surface, a fifth body length from the fifth body front surface to a fifth body rear surface, the fifth body length equal to the first body length, and a fifth body compressibility less than the second compressibility and less than the third body compressibility; and
   a packaging body, the packaging body having a packaging body length from a packaging body front surface to a packaging body rear surface, the packaging body length equal to the first body length, a packaging body height from a packaging body top surface to a packaging body bottom surface, the packaging body height equal to the first body height, and a packaging body first surface from the packaging body top surface to the packaging body bottom surface and from the packaging body front surface to the packaging body rear surface, the packaging body first surface in contact with the first body first surface.

2. The joint seal of claim 1, wherein one of the group consisting of the first body second surface, the second body first surface, the second body second surface, a third body first surface, the fifth body first surface and the fifth body second surface provides an irregular surface.

3. The joint seal of claim 1, wherein one of the group consisting of the first body, the second body, and the third body is foam.

4. The joint seal of claim 1, further comprising a sensor.

5. The joint seal of claim 1, wherein the first body compressibility and the third body compressibility are equal.

6. The joint seal of claim 1, further comprising a flexible barrier adhered to the first body top surface, the second body top surface and the third body top surface.

7. The joint seal of claim 6, wherein the flexible barrier is a silicone sealant.

8. The joint seal of claim 6, wherein the flexible barrier is elastomer sheet.

9. The joint seal of claim 1, further comprising:
   a second packaging body, the second packaging body having a second packaging body length equal to the packaging body length.

10. The joint seal of claim 1, wherein the first body is configured for compression to a first body compressed width, the first body width at least three times the first body compressed width and wherein the second body is configured for compression to a second body compressed width, the second body width at least three times the second body compressed width and wherein the third body is configured for compression to a third body compressed width, the third body width at least three times the third body compressed width.

11. The joint seal of claim 1, further comprising
a first body top width from the first body first surface to the first body second surface at the first body top surface,
a second body top width from the second body first surface to the second body second surface at the second body top surface, and
a third body top width from the third body first surface to the third body second surface at the third body top surface, where the first body width is unequal to the first body top width or the second body width is unequal to the second body top width or the third body width is unequal to the third body top width.

12. The joint seal of claim 1, wherein one of the group consisting of the first body compressibility, the second body compressibility, and the third body compressibility have a value of zero.

13. The joint seal of claim 1, wherein one of the group consisting of the first body, the second body, and the third body is resiliently compressible.

14. The joint seal of claim 1, wherein the fourth body top surface is not aligned with the fifth body top surface.

15. The joint seal of claim 1,
a first body secondary height from the first body top surface to the first body bottom surface at the first body rear surface,
a second body secondary height from the second body top surface to the second body bottom surface at the second body rear surface,
a third body secondary height from the third body top surface to the third body bottom surface at the third body rear surface,
the first body height and the first body secondary height being unequal, the second body height and the second body secondary height being unequal, the third body height and the third body secondary height being unequal.

16. The joint seal of claim 1,
a fourth body secondary height from the fourth body top surface to the fourth body bottom surface at the fourth body rear surface,
a fifth body secondary height from the fifth body top surface to the fifth body bottom surface at the fifth body rear surface,
the fourth body height and the fourth body secondary height being unequal,
the fifth, body height and the fifth body secondary height being unequal.

17. The joint seal of claim 1, wherein the first body height and the second body height are unequal.

18. The joint seal of claim 1, wherein one of the group consisting of the first body, the second body, the third body, the fourth body, and the fifth body includes a barrier therethrough.

19. The joint seal of claim 1, further comprising a rib extending downward into one of the group consisting of the first body, the second body, the third body, the fourth body, and the fifth body.

20. A joint seal, comprising
a first body, the first body having a first body width from a first body first surface to a first body second surface at a first body bottom surface, a first body height from a first body top surface to the first body bottom surface, a first body length from a first body front surface to a first body rear surface, and a first body compressibility;
a second body, the second body having a second body width from a second body first surface to a second body second surface at a second body bottom surface, a second body height from a second body top surface to the second body bottom surface, a second body length from a second body front surface to a second body rear surface, the second body length equal to the front body length, and a second body compressibility;
a third body, the third body having a third body width from a third body first surface to a third body second surface at a third body bottom surface, a third body height from a third body top surface to the third body bottom surface, a third body length from a third body front surface to a third body rear surface, the third body length equal to the first body length, and a third body compressibility;
a fourth body, the fourth body having a fourth body width from a fourth body first surface to a fourth body second surface, a fourth body height from a fourth body top surface to a fourth body bottom surface, the fourth body height less than the first body height and less than the second body height, the fourth body bottom surface vertically intermediate the first body top surface and the first body bottom surface, the fourth body first surface adjacent to the first body second surface, the fourth body top surface vertically intermediate the first body top surface and the first body bottom surface, the fourth body second surface adjacent to the second body first surface, a fourth body length from a fourth body front surface to a fourth body rear surface, the fourth body length, equal to the first body length, and a fourth body compressibility less than the first body compressibility and less than the second body compressibility;
a fifth body, the fifth body having a fifth body width from a fifth body first surface to a fifth body second surface, a fifth body height from a fifth body top surface to a fifth body bottom surface, the fifth body height less than the second body height and less than the third body height, the fifth body bottom surface vertically intermediate the second body top surface and the second body bottom surface, the fifth body first surface adjacent to the second body second surface, the fifth body top surface vertically intermediate the second body top surface and the second body bottom surface, the fifth body second surface adjacent to the third body first surface, a fifth body length from a fifth body front surface to a fifth body rear surface, the fifth body length equal to the first body length, and a fifth body compressibility less than the second compressibility and less than the third body compressibility; and
a packaging body, the packaging body having a packaging body length from a packaging body front surface to a packaging body rear surface, the packaging body length equal to the first body length, a packaging body height from a packaging body top surface to a packaging body bottom surface, the packaging body height equal to the first body height, and a packaging body first surface from the packaging body top surface to the packaging body bottom surface and from the packaging body front surface to the packaging body rear surface, the packaging body first surface in contact with the first body first surface.

\* \* \* \* \*